(12) United States Patent
Hamilton, Jr.

(10) Patent No.: US 9,434,552 B2
(45) Date of Patent: Sep. 6, 2016

(54) WING PULLEY FOR BELT CONVEYOR

(71) Applicant: MARTIN SPROCKET & GEAR, INC., Arlington, TX (US)

(72) Inventor: Lynwood Hector Hamilton, Jr., Hurst, TX (US)

(73) Assignee: MARTIN SPROCKET & HEAR, INC., Arlington, TX (US)

( * ) Notice: Subject to any disclaimer, the term of this patent is extended or adjusted under 35 U.S.C. 154(b) by 0 days.

(21) Appl. No.: 14/809,804

(22) Filed: Jul. 27, 2015

(65) Prior Publication Data
US 2016/0023849 A1 Jan. 28, 2016

Related U.S. Application Data

(60) Provisional application No. 62/029,710, filed on Jul. 28, 2014.

(51) Int. Cl.
*B65G 39/073* (2006.01)

(52) U.S. Cl.
CPC .................................. *B65G 39/073* (2013.01)

(58) Field of Classification Search
CPC .... B65G 39/073; B65G 39/02; B65G 19/07; B65G 39/16; B65G 39/18; B65G 23/04; B65G 45/14; F16H 55/35; F16H 2055/363
USPC ................. 198/498, 842, 834, 835
See application file for complete search history.

(56) References Cited

U.S. PATENT DOCUMENTS

| | | | | |
|---|---|---|---|---|
| 4,180,155 A | * | 12/1979 | Stevick | B65G 45/20 198/498 |
| 5,180,155 A | * | 1/1993 | Asai | B65H 3/02 271/21 |
| 5,421,789 A | * | 6/1995 | Gregg | F16G 1/28 474/153 |
| 6,938,754 B2 | * | 9/2005 | Kanaris | B65G 39/073 198/494 |
| 7,527,142 B1 | * | 5/2009 | Zeltwanger | B65G 39/073 198/494 |
| 2004/0231965 A1 | * | 11/2004 | Dow | B65G 23/04 198/813 |
| 2011/0009251 A1 | * | 1/2011 | Derscheid | A01F 15/18 492/30 |
| 2012/0186945 A1 | * | 7/2012 | Laughlin | B65G 39/073 198/494 |
| 2013/0341162 A1 | * | 12/2013 | Kowalski | B65G 23/04 198/842 |

* cited by examiner

*Primary Examiner* — Mark A Deuble
(74) *Attorney, Agent, or Firm* — Geoffrey A. Mantooth; Brian K. Yost

(57) ABSTRACT

A winged pulley for a conveyor belt has a drum with an outside diameter, a first end portion and a second end portion. A hub is located in each end of the drum, with the hub receiving a shaft. A first set of plural radial wings extends from the first end portion of the drum toward the second end portion, and a second set of plural radial wings extends from the second end portion of the drum toward the first end portion. Each of the wings in the first and second sets of wings has an outer end located adjacent the respective first or second end portions. The first and second sets of wings are arranged helically about the drum in opposite orientations. The inner ends of the first set of wings is circumferentially offset from the inner ends of the second set of wings so as to create gaps between the inner ends of the first set of wings and the inner ends of the second set of wings.

11 Claims, 4 Drawing Sheets

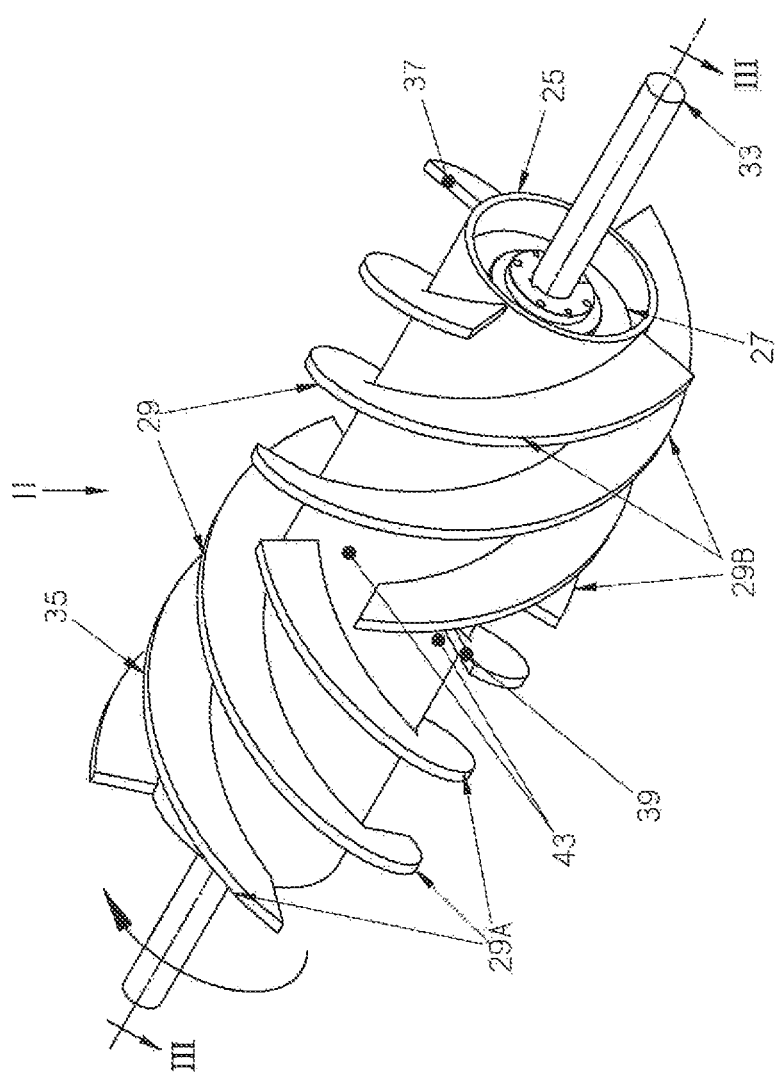

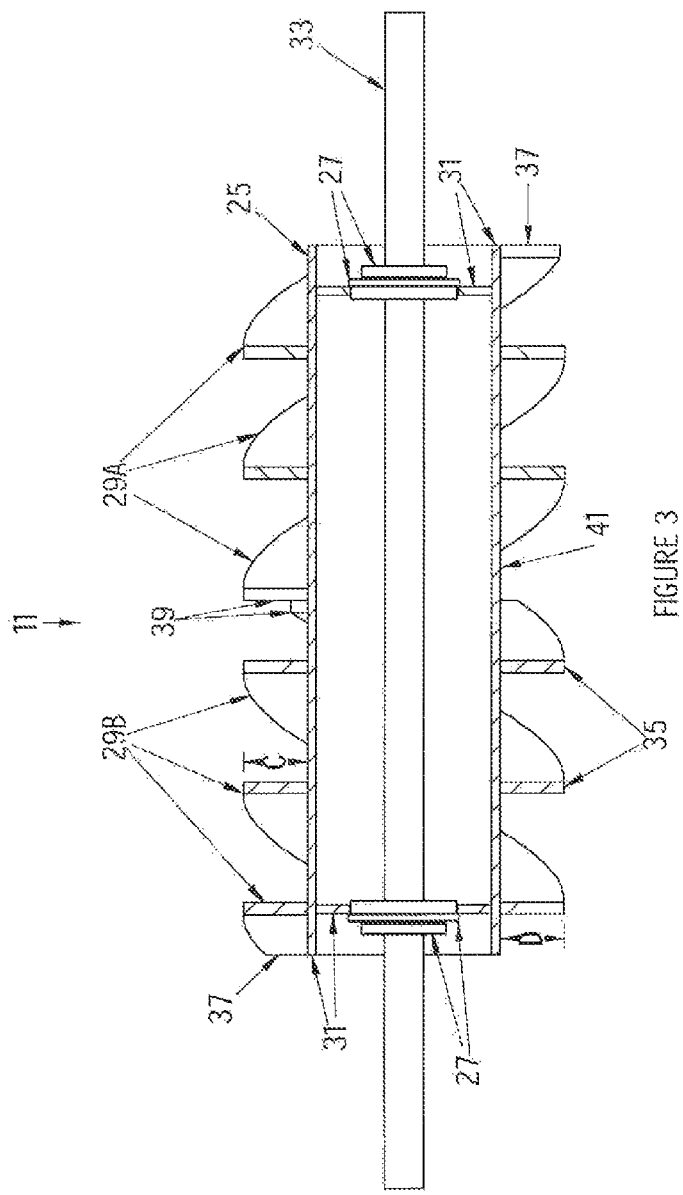
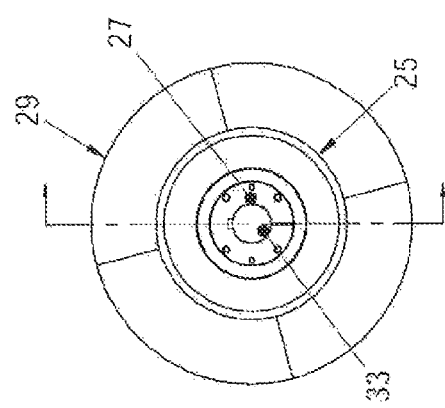

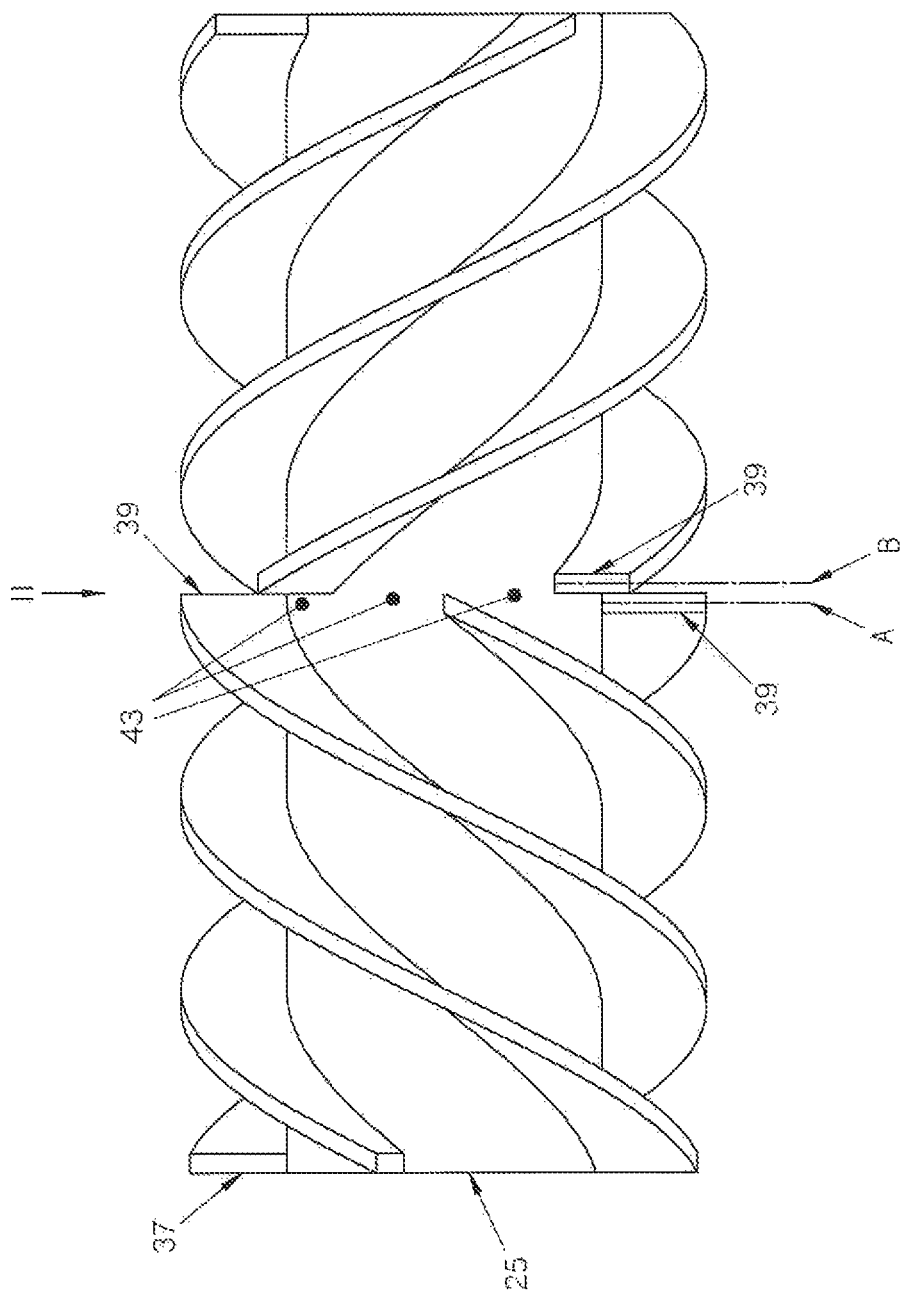

WING PULLEY FOR BELT CONVEYOR

This application claims the benefit of U.S. provisional application Ser. No. 62/029,710 filed Jul. 28, 2014.

FIELD OF THE INVENTION

The present invention relates to wing pulleys of the type that are used in belt conveyors.

BACKGROUND OF THE INVENTION

Belt conveyors are used to transport material from one location to another. For example, belt conveyors can transport material such as gravel, sand, rock, grain, etc. A belt conveyor typically has a number of pulleys for support, as well as a drive pulley to move the conveyor. The drive pulley is typically the head pulley. A tail pulley is located at the other end of the conveyor. The material travels on top of the conveyor from the tail pulley to the head pulley.

Material falls off of the top of the conveyor and onto the bottom of the conveyor belt (which moves from the head pulley to the tail pulley). The material thus becomes located between the tail pulley and the belt conveyor.

If a drum pulley is used, the material can cause damage to the belt and to the pulley. Also the material will cause the belt to lose tracking with the pulley. Tracking is side-to-side alignment of the belt on a pulley. A belt that loses tracking moves to one side or the other on the pulley. Loss of tracking can damage the belt and reduce the load carrying capacity of the belt.

Consequently, wing pulleys are used in such material handling conveyors as the tail pulleys. A wing pulley has wings that extend radially outwardly; the wings contact the belt and act as standoffs. Material on the belt locates between the wings and is not compressed between the belt and the pulley. Thus, damage to the belt and the pulley by the material is minimized. Furthermore, by using a wing pulley, better belt tracking on the pulley is achieved.

Wing pulleys have a number of attributes, including material ejection. Once material enters the spaces between the wings, it is desirable to move that material out of the pulley as soon as possible to avoid material building up or compacting within the pulley, essentially loading the pulley with material. Another attribute is belt tracking; the belt should stay aligned on the pulley regardless of the material entering and ejecting from the pulley.

It is desirable to provide a wing pulley that operates in a satisfactory manner.

SUMMARY OF THE INVENTION

A winged pulley for a conveyor belt, comprises a drum having an outside diameter, a first end portion and a second end portion. A hub is located in each end of the drum, the hub receiving a shaft. A first set of plural wings extends from the first end portion of the drum toward the second end portion, and a second set of plural wings extends from the second end portion of the drum toward the first end portion. Each of the wings in the first and second sets of wings extends radially out from the drum outside diameter. Each of the wings in the first and second sets of wings has an outer end located adjacent to the respective first or second end portions. The first set of wings is arranged helically about the drum in a first orientation. The second set of wings is arranged helically about the drum in a second orientation that is opposite of the first orientation. The inner ends of the first set of wings are circumferentially offset from the inner ends of the second set of wings so as to create gaps between the inner ends of the first set of wings and the inner ends of the second set of wings, which gaps allow material located between the wings to move between the first set of wings and the second set of wings.

In one aspect, the gap between at least one of the inner ends of the first set of wings and a first adjacent inner end of one of the second set of wings is substantially the same as the gap between the one of the inner ends of the first set of wings and a second adjacent inner end of one of the second set of wings.

In another aspect, the inner ends of the first set of wings are coplanar along a first circumferential plane and the inner ends of the second set of wings are coplanar along a second circumferential plane.

In another aspect, the first and second circumferential planes are circumferentially aligned.

In another aspect, the first and second circumferential planes are circumferentially misaligned.

In another aspect, each of the wings in each of the first and second sets of wings has a base where the respective wing is coupled to the drum, and each of the wings has a free edge, each of the wings has a uniform thickness from the respective base to the respective free edge.

In another aspect, each of the five edges contact the conveyor belt when the winged pulley is installed with the conveyer belt.

In another aspect, the pulley has an outside diameter that includes the wings, the outside diameter of the pulley is constant from the first end portion to the second end portion.

In another aspect, the pulley has an outside diameter that includes the wings, the outside diameter of the pulley is greater at the inner ends of the first and second sets of wings than the outside diameter of the pulley at the first and second end portions.

In another aspect, the wing pulley has an outside diameter at the wings, the wings of the first and second sets of wings having a pitch, the pitch being 2-4 times the outside diameter of the pulley.

BRIEF DESCRIPTION OF THE DRAWINGS

FIG. 2 is a perspective view of the wing pulley in accordance with a preferred embodiment.

FIG. 3 is a side cross-sectional view of the wing pulley taken along lines III-III of FIG. 2, with the wing pulley flipped end over end.

FIG. 4 is an end view of the wing pulley of FIG. 3.

FIG. 5 is a side elevational view of the wing pulley of FIG. 2.

DESCRIPTION OF THE PREFERRED EMBODIMENT

Figure 1:
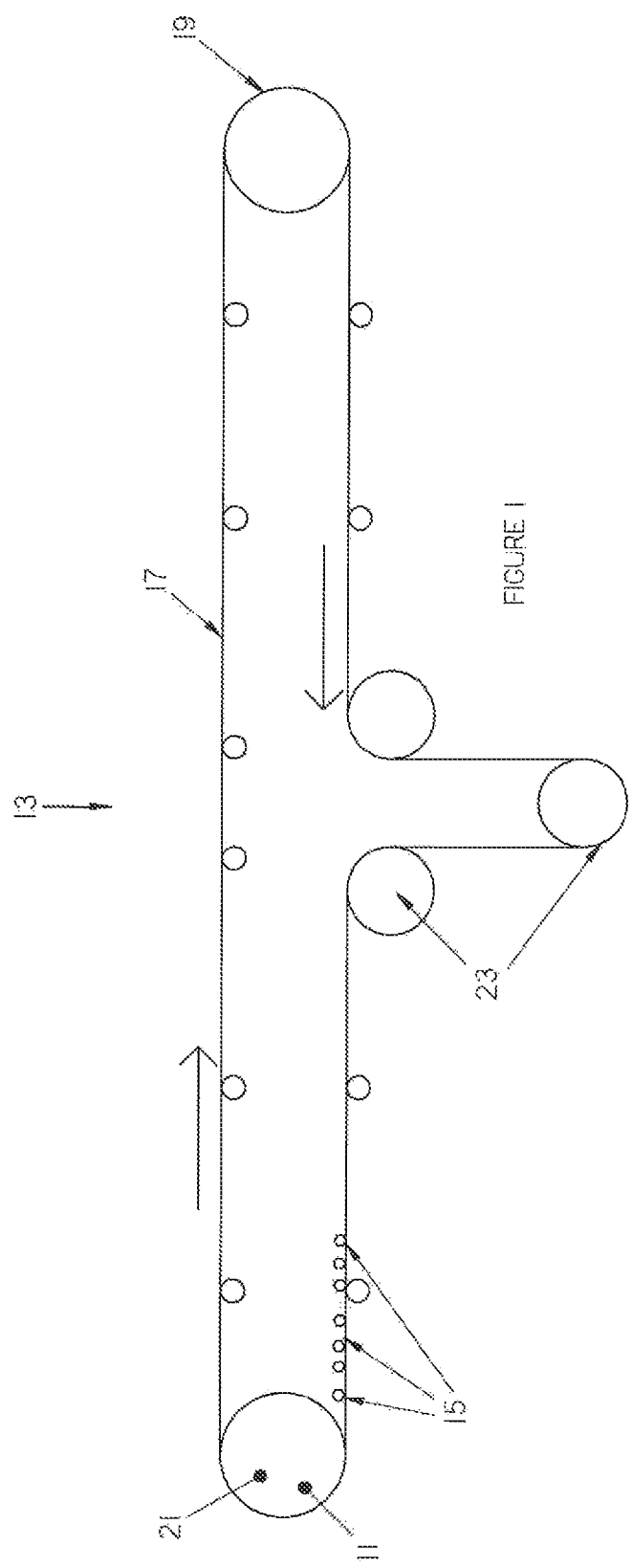
FIG. 1 is a diagram of a conveyor belt and associated pulleys, with the wing pulley shown schematically.

The wing pulley 11 discussed herein is used on belt conveyors 13 (see FIG. 1). The wing pulley is a robust design, producing a stronger and more reliable pulley. The wing pulley ejects material 15 from the spaces between the wings with a minimal number of rotations and is thus particularly effective in ejecting material. The wing pulley provides and maintains concentricity leading to optimal belt tracking. In addition, the wing pulley operates much quieter than wing pulleys of prior art designs such as shown in Mecham U.S. Pat. No. 3,055,229.

In FIG. 1, there is shown a belt conveyor 13. The conveyor 13 has a belt 17 that travels over a head pulley 19, a tail pulley 21 and a number of other pulleys 23. The tail pulley 21 is the wing pulley 11. The head pulley 19 is typically the drive pulley. The top of the belt 17 moves from the tail pulley 21 to the head pulley 19, while the bottom of the belt moves from the head pulley to the tail pulley. Material 15 can fall off the top of the belt and land at the bottom of the belt, where it is moved into the tail pulley 21.

Referring to FIGS. 2-5, the wing pulley 11 includes a drum 25, hub and bushing 27 and wings 29 or flights. In the description herein, terms such as "right" and "left" may be used with reference to the orientation shown in FIGS. 2 and 3. FIG. 3 shows the wing pulley flipped end over end from the orientation shown in FIG. 2. The right end of the pulley in FIG. 2 is the left end of the pulley shown in FIG. 3 and vice versa.

The drum 25 is a hollow cylinder with two ends 31. The drum has a length between the two ends 31 and a constant outside diameter along its length.

A hub and bushing 27 is located in each end 3 of the drum. Each hub 27 has an inside diameter that is sized to receive a shaft 33. The shaft rotates in unison with the pulley. As an alternative, bearings can be provided so that the pulley rotates about the shaft.

The wings 29 are arranged in helical patterns on the drum. The drum has a first set 29A of wings and a second set 29B of the wings. Each set of wings has plural wings. As shown in FIG. 2, each set of wings has four wings. However, the number of wings in a set can vary. The first set 29A extends from the one end of the drum (the left end of the drum in FIG. 2, the right end of the drum in FIG. 3) toward the opposite end, while the second set 29B extends from the other end of the drum (the right end of the drum in FIG. 2, the left end of the drum in FIG. 3 toward the one end. In the preferred embodiment, each set 29A, 29B extends for half of the length of the drum 25. When the pulley is viewed from the left end of FIG. 3, as shown in FIG. 4, (and the right end of FIG. 2) the second set 29B of wings extend in a clockwise direction about the drum and the first set 29A of wings extend in a counterclockwise direction. Thus, the first set of wings 29A has the opposite helical pattern of the second set 29B of wings.

Each wing 29 is a plate helically wrapped about and coupled to the drum. Coupling occurs by welding. Each wing is welded along the entire length of the wing. In the preferred embodiment, the each wing is welded with a continuous weldment. Each wing extends radially out from the drum along the length of the wing. Each wing has a thickness that sufficient such that a contact bar along the outer edge of the wing is not necessary or provided and such that the wing can support the belt. Thus, the thickness of the wing is substantially the same at the base of the wing (where the wing is coupled to the drum) and at the free edge 35 (that contacts the belt). In the prior art, wing thickness is 3/16-3/8 inches. The wing 29 thickness of the pulley 11 is 3/8-3/4 inches thick and in some cases may be as thick as 1 inch. The free edges 35 of the wings may be rounded or square. If square, wear by the belt will round out the edges. Because the wings lack contact bars, the freed edges 35 of the wings contact the belt directly.

Each wing 29 has two ends 37, 39. One end, an outer end 37, is located adjacent to the respective drum end 31. The outer ends 37 of the wings can be aligned longitudinally (along the axis of the shaft 33) with the drum ends 31. Alternatively, the outer ends can be shorter than, or longer than, the drum ends. The other end, an inner end 39, is located in a central portion 41 of the drum. The inner ends 39 of the second set 29B of wings are separated from and interspersed between the inner ends of the first set 29A of wings. This creates gaps 43 (see FIGS. 2 and 5) between the inner ends 39 of the two sets 29A, 29B of wings. Such gaps 43 allow material to move freely within the central portion 41 of the pulley. For example, if there are 6 wings in each set 29A, 29B, then the inner ends 39 of the wings 29 in each set are located 60 degrees apart from adjacent wings in the set. However, in keeping with the same example, the inner ends of the first set of wings are located 30 degrees apart from the respective adjacent second set inner ends. Such circumferential spacing creates the gaps 43 between the inner ends of the right hand set and left hand set of wings.

Each of the inner ends of the first set of wings is located halfway, circumferentially between the two adjacent inner ends of the second set of wings. Thus, the gaps 43, in circumferential terms, are of equal size to each other.

In a preferred embodiment, the inner ends 39 of the first set 29A of wings are all circumferentially aligned with one another. Likewise, the inner ends 39 of the second set 29B of wings are all circumferentially aligned with one another.

The size of the gaps 43 between the inner ends 39 can be adjusted by adjusting the longitudinal alignment of the inner ends of one set relative to the other. In the preferred embodiment, the inner ends of each set of wings are located in respective planes A, B (see FIG. 5), which planes are transverse to the longitudinal axis of the drum. The plane A of inner ends of the first set 29A is adjacent to the plane B of inner ends of the second set 29B of wings. These planes A, B can be offset slightly (with the plane A to the left of plane B, referring to the orientation of FIG. 5), aligned (where the planes A, B are co-planar), or overlapping (where plane B is to the left of the plane A and plane A is to the right of plane B).

The inner ends 39 of the wings can be shaped in various ways. In the preferred embodiment, the inner ends 39 are cut flat along the longitudinal axis of the drum. The outer ends 37 may be cut the same way. Alternatively, the inner ends can be cut flat along a circumference of the drum, or the inner ends can be rounded.

The wings 29 have a pitch. In the preferred embodiment, the pitch is 2.0 to 4.0 times the outside diameter of the pulley (which outside diameter includes the wings). For example, for a pulley having an outside diameter of 24 inches (including the wings), if the pitch is 2.0, the pitch of each wing flight is 48 inches. The pitch is measured on an individual wing, not between two adjacent wings, as there are plural wings 29 per set 29A, 29B.

The pitch thus presents a sufficient length of wing to support the belt, while effectively moving material out of the pulley.

In many instances, the length of the pulley ma be too short to be equipped with one complete pitch or revolution of the wings in a set.

The height of the wings as they extend radially from the drive is small relative to the outside diameter of the drum. The height of the wings is between 1/6 to 1/3 of the outside diameter of the drum. The height or extension of the wings from the drum is uniform. As shown in FIG. 3, the height of the wings near the inner ends is "C", while the height of the wings near the outer ends is "D". The height "C" is the same as the height "D".

Alternatively, the wing pulley 11 can be provided with a crown to provide better tracking of the belt. To create the crown, each wing 29 has a greater height at its inner end 39 than at its outer end 37. The height C in FIG. 3 at or near the inner end 39 is greater than the height D at or near the outer end 37. (FIG. 3 is not drawn to scale. For illustrative purposes, the dimensions C and D are not shown at the wing ends, but at the cross-section of the wings.) The effect of the height differential is to create a crown in the center, where the outside diameter of the pulley is greater than the outside diameter at the ends.

In operation, the pulley 11 rotates in the direction shown by the arrow in FIG. 2. The material 15 entering the pulley from the belt is located between the wings 29, which pushes the material out to the ends 31 of the drum (sides of the belt). The material in the center of the belt is able to be swept to either side because the gaps 43 between the inner ends of the wings allow free movement of the material from one set of wings to the other set of wings.

The foregoing disclosure and showings made in the drawings are merely illustrative of the principles of this invention and are not to be interpreted in a limiting sense.

The invention claimed is:

1. A winged pulley for a conveyor belt, comprising:
    a drum having an outside diameter, a first end portion and a second end portion;
    a hub located in each end of the drum, the hub receiving a shaft;
    a first set of plural wings extending from the first end portion of the drum toward the second end portion, and a second set of plural wings extending from the second end portion of the drum toward the first end portion, each of the wings in the first and second sets of wings extending radially out from the drum outside diameter, each of the wings in the first and second sets of wings having an outer end located adjacent the respective first or second end portions, and each of the wings in the first and second sets of wings having an inner end;
    the first set of wings arranged helically about the drum in a first orientation, the second set of wings arranged helically about the drum in a second orientation that is opposite of the first orientation, each of the wings a base that is coupled to the drum and a free edge, each of the inner ends extending from the respective base to the respective free edge, each of the wings having a radial extension from the drum that is ⅙ to ⅓ the outside diameter of the drum;
    the inner ends of the first set of wings being circumferentially offset from the inner ends of the second set of wings so as to create gaps between the inner ends of the first set of wings and the inner ends of the second set of wings, the gaps located between the bases of the inner ends of adjacent wings, which gaps allow material located between the wings to move between the first set of wings and the second set of wings.

2. The winged pulley of claim 1 wherein the gap between at least one of the inner ends of the first set. of wings and a first adjacent inner end of one of the second set of wings is substantially the same as the gap between the one of the inner ends of the first set of wings and a second adjacent inner end of one of the second set of wings.

3. The winged pulley of claim 1 wherein the inner ends of the first set of wings are coplanar along a first circumferential plane and the inner ends of the second set of wings are coplanar along a second circumferential plane.

4. The winged pulley of claim 3 wherein the first and second circumferential planes are circumferentially aligned.

5. The winged pulley of claim 3 wherein the first and second circumferential planes are circumferentially misaligned.

6. The winged pulley of claim 1 wherein each of the wings has a uniform thickness from the respective base to the respective free edge.

7. The winged pulley of claim 6 wherein each of the free edges contact the conveyor belt when the winged pulley is installed with the conveyer belt.

8. The winged pulley of claim 1 wherein the pulley has an outside diameter that includes the wings, the outside diameter of the pulley is constant from the first end portion to the second end portion.

9. The winged pulley of claim 1 wherein the pulley has an outside diameter that includes the wings, the outside diameter of the pulley is greater at the inner ends of the first and second sets of wings than the outside diameter of the pulley at the first and second end portions.

10. The winged pulley of claim 1 wherein the pulley has an outside diameter at the wings, the wings of the first and second sets of wings having a pitch, the pitch being 2-4 times the outside diameter of the pulley.

11. The winged pulley of claim 6 wherein each of the wings has a radial extension form the drum that is ⅙ to ⅓ of the outside diameter of the drum.

* * * * *